(12) United States Patent
Goupil, Jr. et al.

(10) Patent No.: US 7,527,551 B2
(45) Date of Patent: May 5, 2009

(54) SLIDING VALVE, ESPECIALLY FOR HEATING, VENTILATION AND AIR CONDITIONING SYSTEM

(75) Inventors: Gerald M. Goupil, Jr., N. Tonawanda, NY (US); Gregory J. Kowalski, Cambria, NY (US); Mark W. Stevenson, Appleton, NY (US)

(73) Assignee: Delphi Technologies, Inc., Troy, MI (US)

( * ) Notice: Subject to any disclaimer, the term of this patent is extended or adjusted under 35 U.S.C. 154(b) by 708 days.

(21) Appl. No.: 11/120,737

(22) Filed: May 3, 2005

(65) Prior Publication Data

US 2006/0046633 A1 Mar. 2, 2006

Related U.S. Application Data

(60) Provisional application No. 60/605,314, filed on Aug. 27, 2004.

(51) Int. Cl.
*B60H 1/00* (2006.01)
*F24F 7/007* (2006.01)

(52) U.S. Cl. .......................... 454/121; 454/69; 454/156; 165/43; 251/901

(58) Field of Classification Search .................. 454/69, 454/121, 156, 160; 251/901; 165/43
See application file for complete search history.

(56) References Cited

U.S. PATENT DOCUMENTS

| | | | | |
|---|---|---|---|---|
| 2,254,459 | A * | 9/1941 | Swanda | 160/239 |
| 2,567,536 | A * | 9/1951 | Wolters et al. | 312/271 |
| 2,692,515 | A * | 10/1954 | Scurlock | 475/236 |
| 3,065,950 | A * | 11/1962 | Goldberg | 251/160 |
| 3,299,442 | A * | 1/1967 | White et al. | 604/322 |
| 4,964,422 | A * | 10/1990 | Ball et al. | 137/512.1 |
| 4,967,778 | A * | 11/1990 | Ball et al. | 137/1 |
| 5,051,013 | A * | 9/1991 | Song | 400/498 |
| 5,145,456 | A | 9/1992 | Ito et al. | |
| 5,154,223 | A | 10/1992 | Ishimaru et al. | |

(Continued)

FOREIGN PATENT DOCUMENTS

DE 38 20 525 C2 2/1992

(Continued)

OTHER PUBLICATIONS

EP 05 07 6843 European Search Report dated Feb. 1, 2006.

(Continued)

*Primary Examiner*—Steven B McAllister
*Assistant Examiner*—Patrick F. O'Reilly, III
(74) *Attorney, Agent, or Firm*—Patrick M. Griffin

(57) ABSTRACT

A valve includes a film having side edges and an opening to extend across a passage in a housing of a HVAC system. The film has a circular aperture in the film adjacent each rounded corner of each opening for relieving stress. Either or both of the leading edge and the trailing edge of the film are undulated to prevent deformation of the edges. A pair of racks is disposed on the film and sprockets engage the teeth of the racks for moving the racks and the film linearly. Each rack includes a strap and bearing member for retaining the associated sprocket in engagement with the teeth. The bearing member is in rolling engagement with a bearing surface of the associated strap as it rotates with the sprockets.

14 Claims, 6 Drawing Sheets

U.S. PATENT DOCUMENTS

| | | | |
|---|---|---|---|
| 5,160,115 | A | 11/1992 | Ito et al. |
| 5,243,830 | A | 9/1993 | Ito et al. |
| 5,472,790 | A | 12/1995 | Thompson |
| 5,564,979 | A | 10/1996 | Sumiya et al. |
| 5,653,630 | A | 8/1997 | Higashihara |
| 5,676,595 | A | 10/1997 | Sumiya et al. |
| 5,885,152 | A | 3/1999 | Lardlaw |
| 5,890,651 | A | 4/1999 | Kanda |
| 5,899,262 | A | 5/1999 | Yamaguchi et al. |
| 5,899,806 | A | 5/1999 | Hase et al. |
| 5,916,021 | A | 6/1999 | Danieau |
| 5,964,658 | A | 10/1999 | Aizawa ............... 454/156 |
| 6,045,444 | A | 4/2000 | Zima et al. |
| 6,048,263 | A | 4/2000 | Uchida et al. |
| 6,074,294 | A | 6/2000 | Stevenson ............ 454/121 |
| 6,270,400 | B1 | 8/2001 | Tsurushima et al. |
| 6,293,339 | B1 | 9/2001 | Uemura et al. |
| 6,305,462 | B1 | 10/2001 | Tsurushima et al. |
| 6,347,988 | B1 | 2/2002 | Kurokawa et al. |
| 6,351,961 | B1 | 3/2002 | Kurokawa et al. |
| 6,354,935 | B1 | 3/2002 | Kurokawa et al. |
| 6,382,305 | B1 | 5/2002 | Sano |
| 6,383,959 | B1 | 5/2002 | Morris et al. ............ 442/218 |
| 6,450,877 | B2 | 9/2002 | Tsurushima et al. |
| 6,508,703 | B1 | 1/2003 | Uemura et al. |
| 6,568,468 | B1 | 5/2003 | Uemura et al. |
| 6,588,495 | B2 | 7/2003 | Ito et al. |
| 6,612,922 | B2 | 9/2003 | Uemura et al. |
| 6,669,549 | B2 | 12/2003 | Uemura et al. |
| 6,688,964 | B2 | 2/2004 | Uemura et al. |
| 6,811,481 | B2 | 11/2004 | Uemura et al. |
| 2001/0008148 | A1 | 7/2001 | Ito et al. |
| 2002/0197951 | A1* | 12/2002 | Uemura et al. ............ 454/121 |
| 2003/0171091 | A1 | 9/2003 | Uemura et al. |
| 2003/0232590 | A1 | 12/2003 | Okumura et al. |
| 2004/0043720 | A1 | 3/2004 | Uemura et al. |

FOREIGN PATENT DOCUMENTS

| | | | |
|---|---|---|---|
| EP | 1118481 A1 | | 7/2001 |
| EP | 1346859 A | | 9/2003 |
| EP | 1375210 A | | 1/2004 |
| FR | 2815107 A | | 4/2002 |
| JP | 58067409 A | * | 4/1983 |
| JP | 11240321 A | * | 9/1999 |

OTHER PUBLICATIONS

EP 05 07 6843 European Search Report dated Oct. 18, 2005.

* cited by examiner

SLIDING VALVE, ESPECIALLY FOR HEATING, VENTILATION AND AIR CONDITIONING SYSTEM

RELATED APPLICATIONS

This patent application claims priority to and all advantages of U.S. Provisional Patent Application No. 60/605,314, which was filed on Aug. 27, 2004.

BACKGROUND OF THE INVENTION

1. Field of the Invention

The subject invention relates to a heating, ventilation and air conditioning (HVAC) system of the type including a valve for controlling air flow. More specifically, the HVAC systems include a film valve that is linearly movable for controlling air flow.

2. Description of the Prior Art

These HVAC systems are known in the art for use in vehicles and include a housing defining an air passage for directing air flow through the housing. A valve includes a film having side edges and an opening disposed between the side edges. The film is supported by the housing to extend across the passage for controlling air flow through the passage. The systems include a mechanism for moving the film linearly to block air flow and to allow air flow through the opening in the film. Such mechanisms frequently include a rack extending along the film and having teeth disposed therealong and a sprocket having sprocket teeth engaging the teeth for moving the rack and the film linearly. U.S. Pat. No. 6,669,549 to Uemura et al. discloses an HVAC system as described above.

One of the problems with prior art HVAC systems that include the film is that the housing of the HVAC system is solely relied upon to prevent the film from succumbing to force exerted on the film from the air flow and vibration. More specifically, the film is sandwiched within the housing, which maintains the teeth of the rack in contact with the sprocket. Any misalignment of the film due to catching on the housing, movement within the housing due to air loading, or vibration can cause the teeth to become misaligned with the sprocket. The misalignment may result in excessive noise or, ultimately, loss of valve function.

Thus, there is an opportunity to overcome the deficiencies of the prior art HVAC systems to provide a film and a mechanism for moving the film linearly that is not prone to failure due to misalignment between the teeth and the sprocket.

SUMMARY OF THE INVENTION AND ADVANTAGES

The invention provides a heating, ventilation and air conditioning (HVAC) system including a housing that defines an air passage for directing air flow through the housing. A valve includes a film that has side edges and an opening disposed between the side edges. The film is supported by the housing to extend across the passage. A rack extends along the film and has teeth disposed therealong. A first sprocket is rotatably supported by the housing for rotation about an axis. The first sprocket engages the teeth for moving the rack and the film linearly. The invention provides for the rack including a retainer for retaining the sprocket teeth in engagement with the teeth on the rack.

Accordingly, the rack includes an integrated locating feature to minimize valve effort and to minimize sliding noises. This system may also eliminate guide pins, or the like on the edges of the film to guide or control edge movement. In addition, the retainer provides a more robust engagement between the drive mechanism and the film compared to prior art systems to prevent failure due to misalignment between the sprocket and the teeth. The film is also designed to eliminate stress concentrations, making the film more robust against tearing. Furthermore, the positioning of the rack on the film enables flexibility for engineering of openings in the film, both in terms of geometry of the openings and position of the openings within the film.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
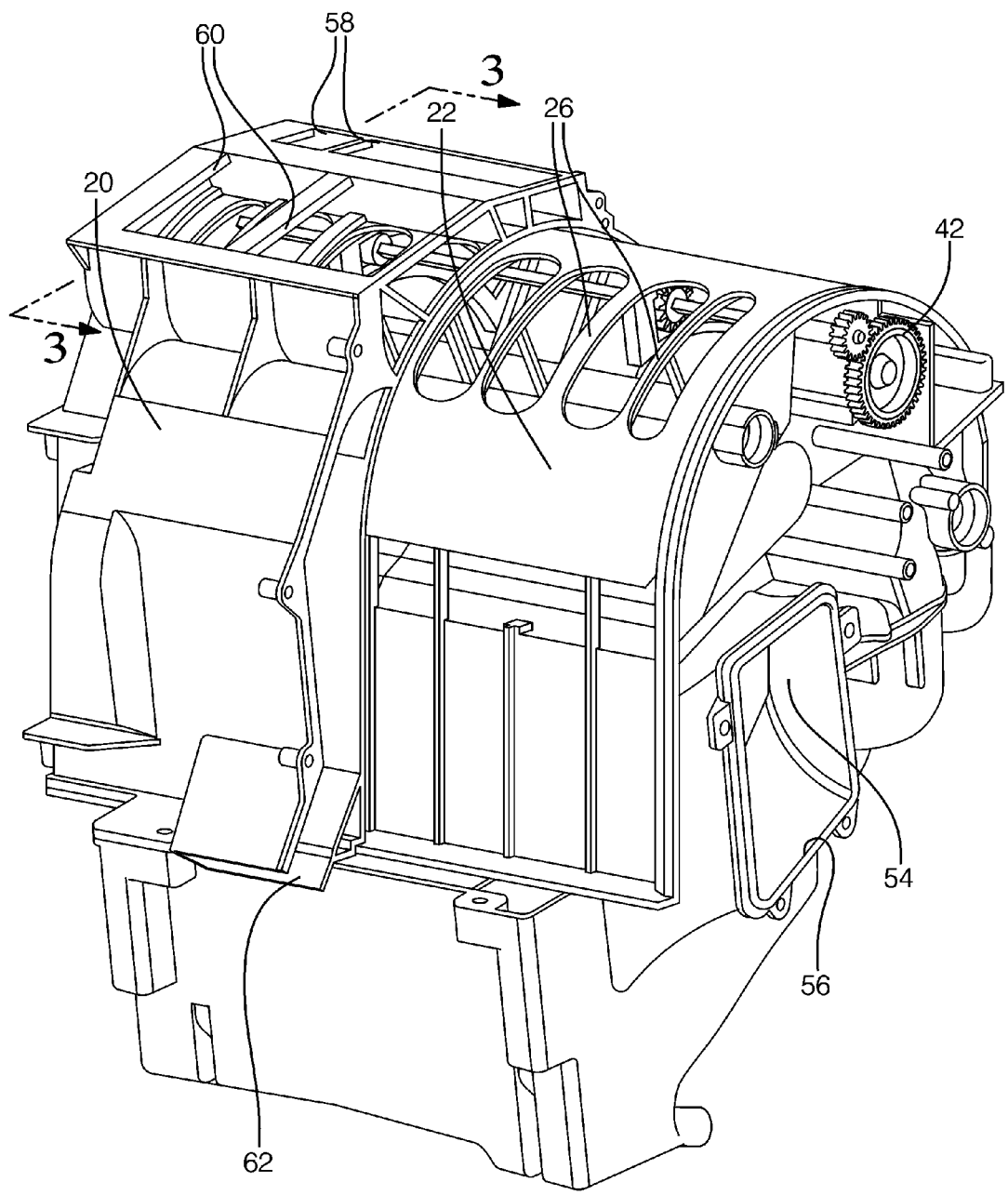
FIG. 1 is a partially cut away perspective view of a HVAC system employing the valve of the subject invention.
Figure 2:
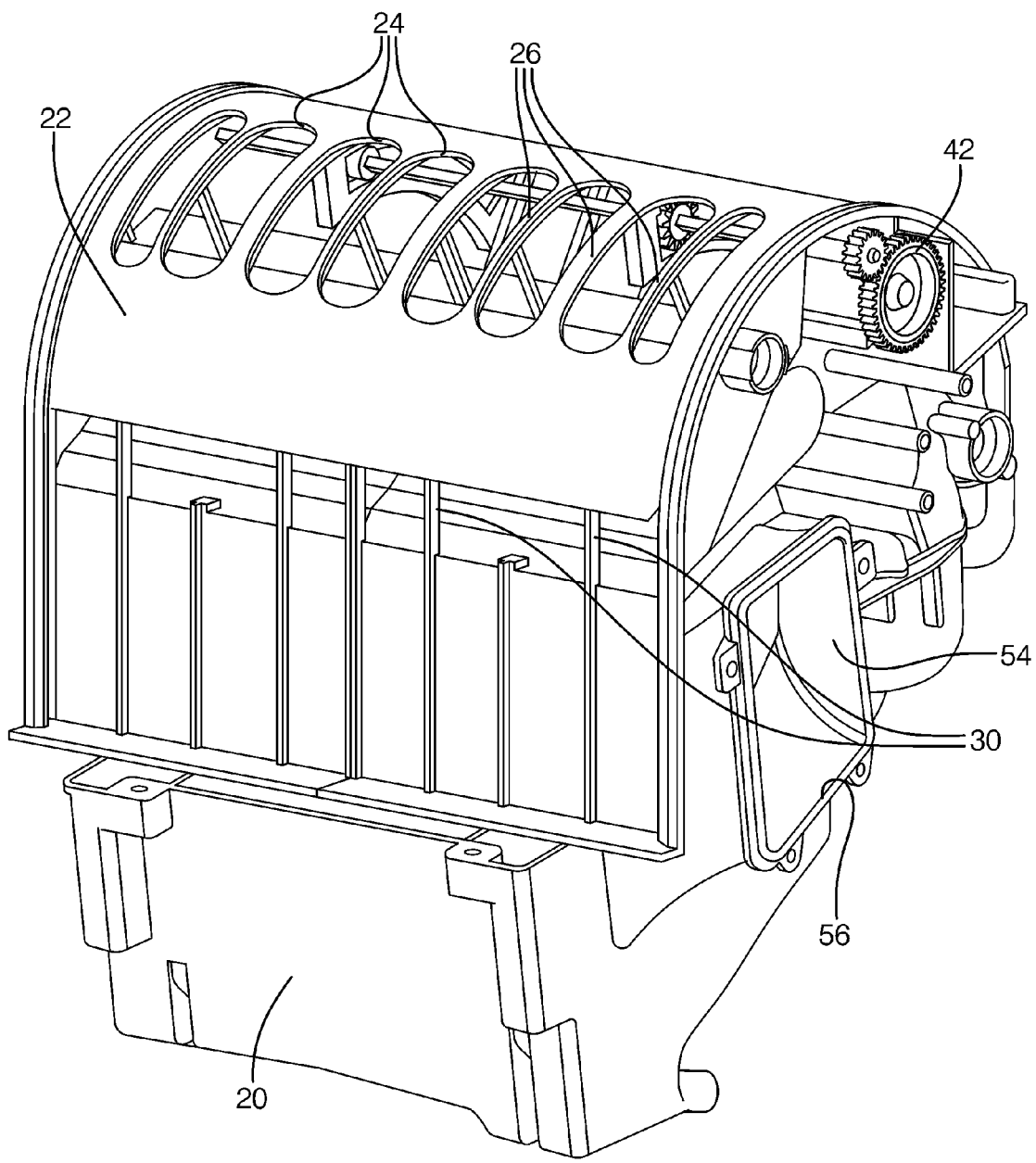
FIG. 2 is a perspective view like FIG. 1 partially cutaway to show the valve of the subject invention.

A heating, ventilation and air conditioning (HVAC) system is generally shown in FIG. 1 with the housing 20 partially removed to show the valve of the subject invention. The housing 20 is typically made of resin and mounted approximately centrally in the vehicle (not shown) behind a dashboard in the passenger compartment. The housing 20 defines an air passage 54 that extends through the entire housing 20 for directing air flow through the housing 20. The housing includes an air inlet 56 to feed air to the air passage 54. The housing 20 also includes one or more outlets, e.g., passenger compartment and/or defrost, etc. The air flow is directed through the housing 20, i.e., through the air passage 54, to the outlets. A blower (not shown) is attached to the housing 20 to move air through the air passage 54. The housing 20 may also define additional air passages (not shown). If the housing 20 defines additional air passages, the additional air passages also direct air flow through the housing 20 in concert with the air passage 54.

Figure 3:
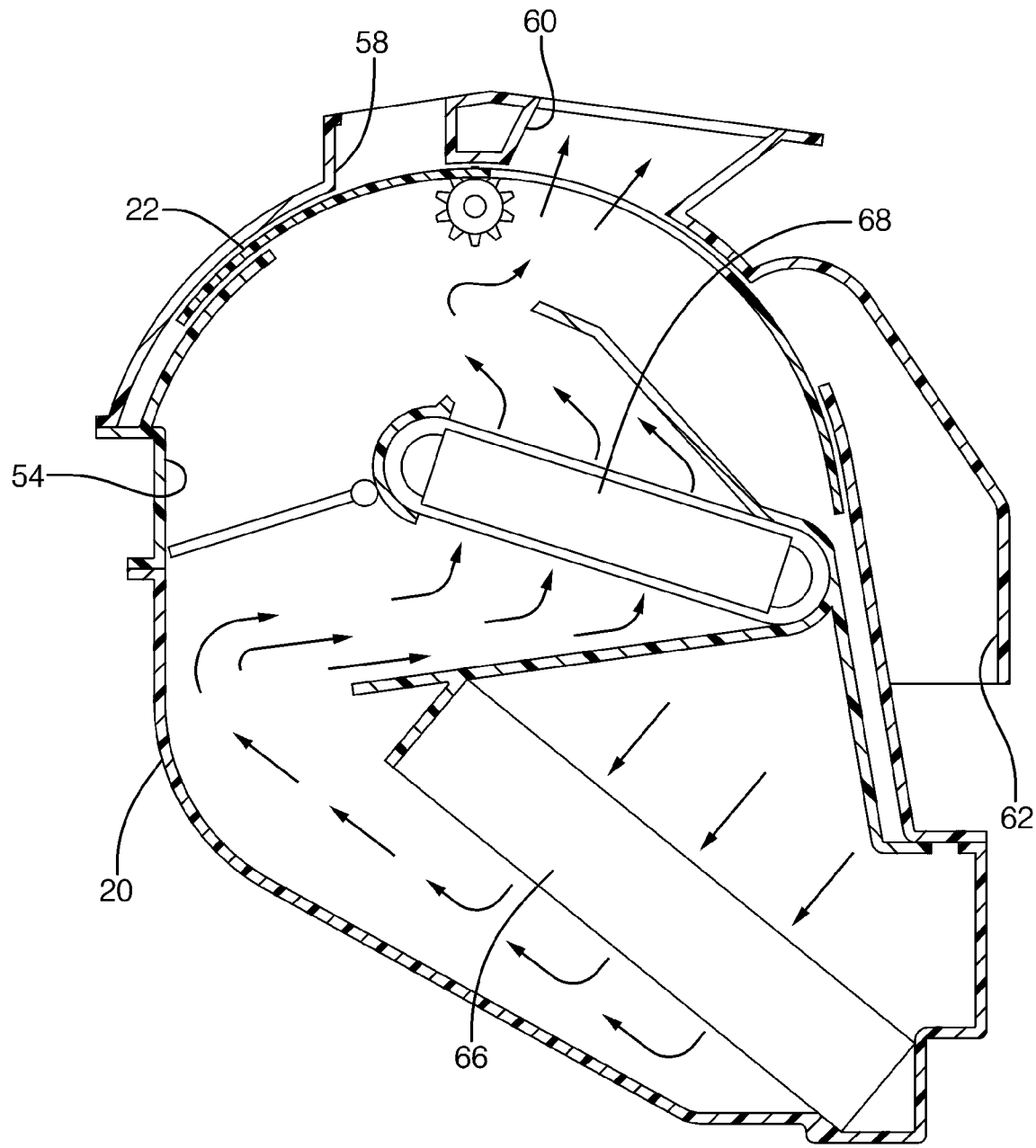
FIG. 3 is a cross-sectional view of the HVAC system of FIG. 1 taken along line 3-3.
Figure 4:
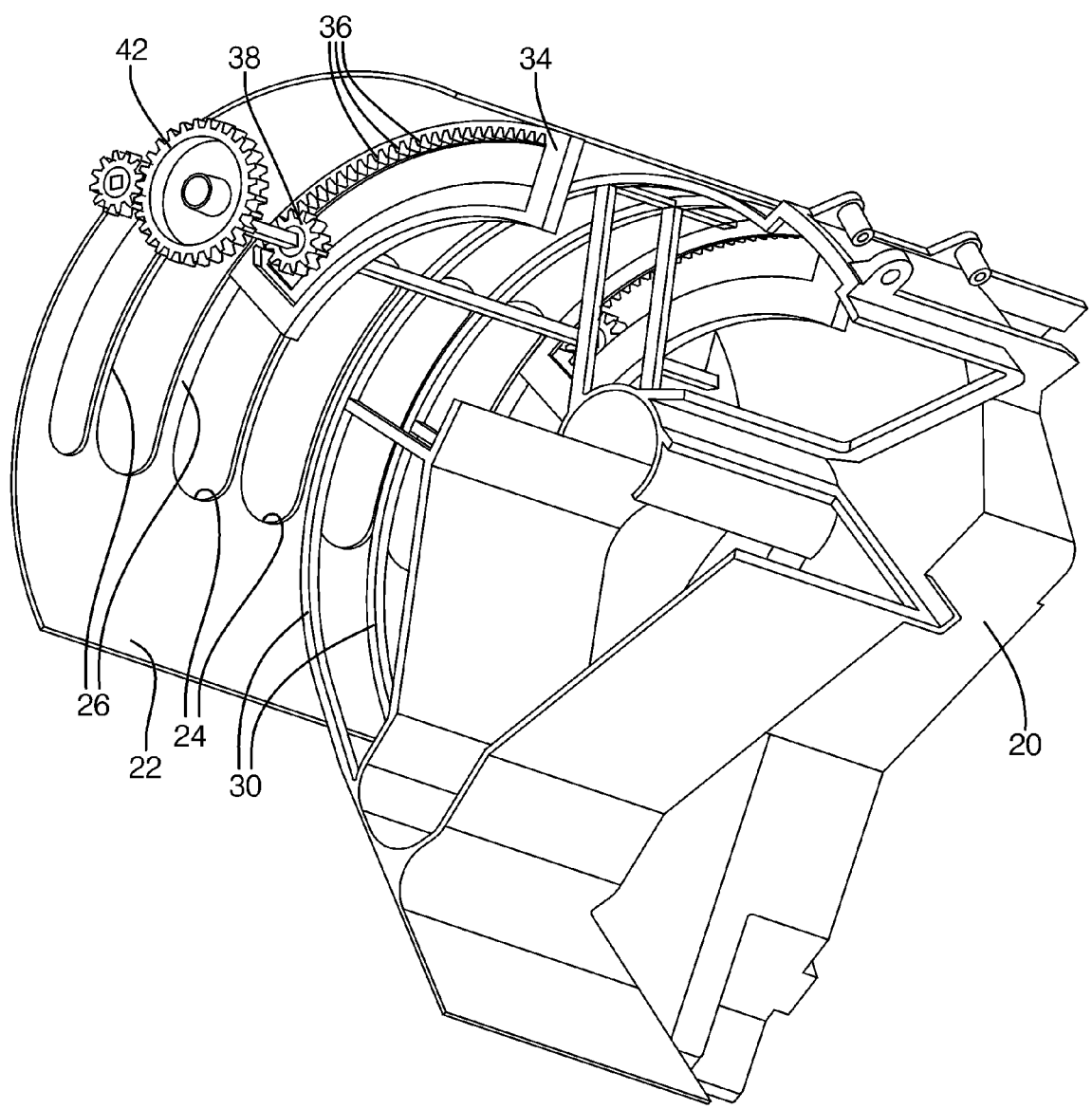
FIG. 4 is a perspective view from the bottom of the valve combined with a portion of the HVAC system.

Referring to FIG. 3, an evaporator core 66 and a heater core 68 are disposed inside the housing 20 usually in that order from an air-upstream side. The evaporator core 66 is a part of an ordinary refrigerating cycle, and is used as a cooling heat exchanger for cooling air flowing through the housing 20. Refrigerant in the evaporator core 66 is evaporated by absorbing heat from air passing through the passage 54, so that air passing through the evaporator core 66 is cooled. The heater core 68 is a heat exchanger supported in the housing 20 for exchanging heat with air passing through the air passage 54, i.e., heating air inside the housing 20 by using hot water (engine-cooling water) flowing therethrough as a heat source.

The housing 20 includes a plurality of the outlets and a valve including a film 22 is disposed to extend across the passage 54 for controlling air flow out through the outlets. Among the outlets, a defroster port 58 is connected to a defroster duct (not shown), so that conditioned air is blown through a defroster vent (not shown) at a top end of the defroster duct toward an inner side of a front windshield (not shown) of the vehicle. A face duct (not shown) is connected to a face port 60, so that conditioned air is blown from a face vent (not shown) at a top end of the face duct toward the upper body of a passenger in a passenger compartment of the vehicle. Also, a foot delivery duct (not shown) is connected to a foot port 62, and foot vents (not shown) for blowing conditioned air toward the foot area of the passenger in the passenger compartment. The foot vents are provided at the ends of branches (not shown) of the foot delivery duct on the housing 20.

The film 22 has side edges and an opening 24 disposed between the side edges. Preferably, the film 22 has a plurality of the openings 24. A strip 26 of the film 22 extends linearly of the film 22 between the openings 24. The strips 26 may all be of substantially equal size in order to provide support for the film 22 in the area of the openings 24. Alternatively, as will be discussed in further detail below, some of the strips 26 may be wider than others for providing additional support to the film 22 where needed.

Figure 7:
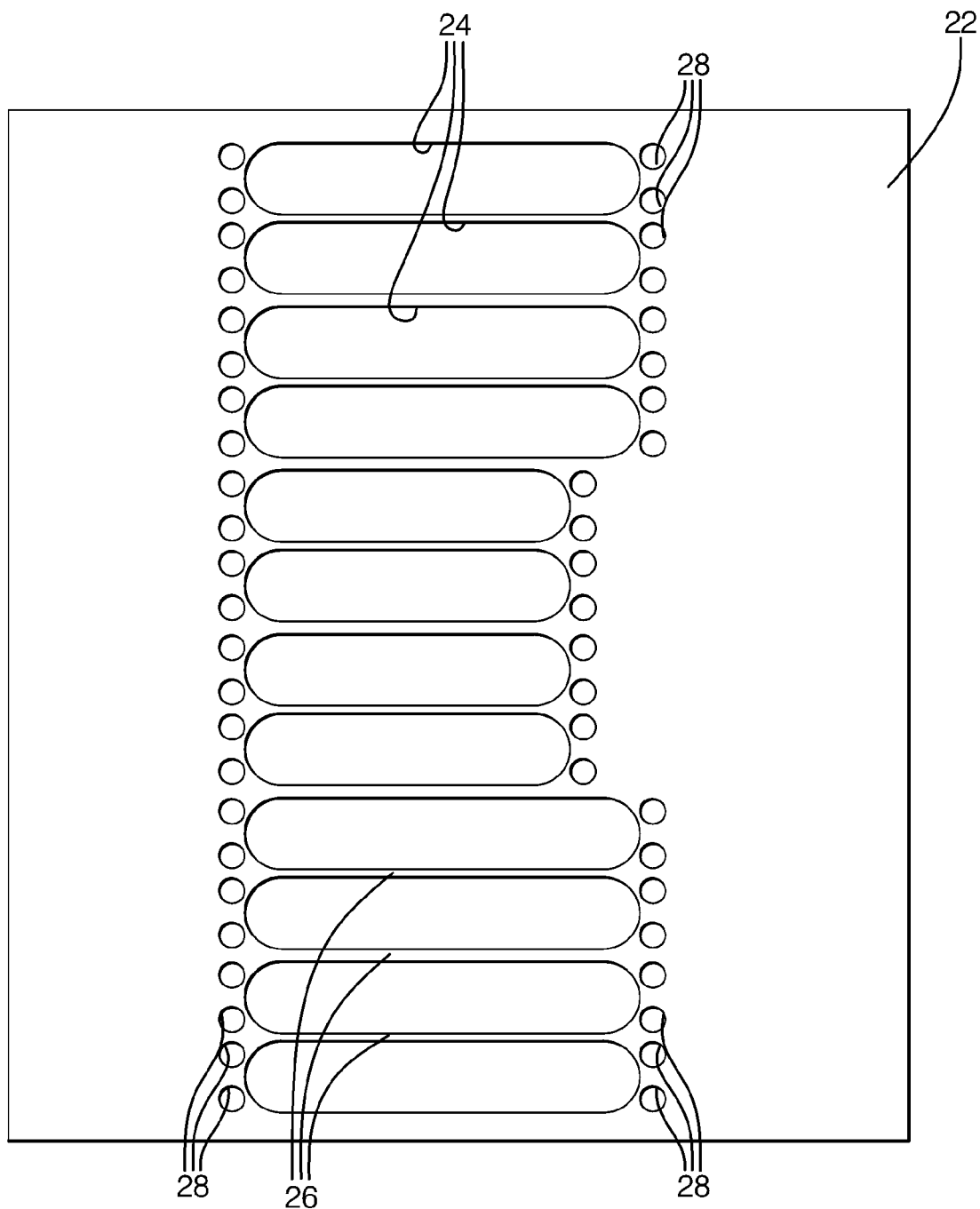
FIG. 7 is a plan view of the film and showing the configuration of the openings therein.

Each opening 24 in the film 22 is elongated with parallel sides and rounded corners. As will become apparent below, the film 22 may be maintained in an arced shape, which subjects the film 22 to constant bending stress. Furthermore, the constant air flow exerts forces on the film 22 that cause internal stresses. The rounded corners prevent tearing of the film 22 when the film 22 is subjected to stress. The alleviation of stress decreases tearing, cracking, or other mechanical failure of the film 22. The film 22 has at least one circular aperture 28 in the film 22 adjacent each opening 24 therein, which further relieve stress by focusing the stress away from the openings 24. Preferably, one of the apertures 28 is disposed adjacent each of the corners of each opening 24 with a portion of each aperture 28 disposed between the parallel sides of the opening 24. In other words, the apertures 28 at least partially overlap with the openings 24 in the linear direction of the film 22. The position of the apertures 28 minimizes noise as the bending stress is varied on the film 22. Referring to FIG. 7, the openings 24 may be of different lengths so that the stress is not concentrated along a single axis passing through ends of the openings 24. Furthermore, the different lengths of the openings 24 may be due to customization that is often required to achieve performance targets, such as achieving a desired air flow profile without yielding unacceptable noise levels.

In addition to the openings 24, either the leading edge or the trailing edge may define another opening 24 with the housing 20 to facilitate the air flow out of the passage 54. This allows desired air distributions to be achieved without using a longer length of film, which adds cost to the HVAC system. Furthermore, the use of additional film 22 would require additional time to position the film 22 to achieve the desired air flow profile.

The edges of the film 22 are supported by the sides of a frame in the housing 20. The frame includes a plurality of parallel and spaced ribs 30 engaging the strips 26 between the openings 24 for supporting the film 22. To allow the size of the housing 20 to be made compact, the supporting frame and film 22 extend along a curvature whereby the film 22 moves linearly in a curved or arcuate path. Preferably the curvature is between flat and a radius of 100 mm. Accordingly, the film 22 is made of a flexible plastic material, e.g., polypropylene, having a thickness between 0.001 and 0.03 inches and a flexural modulus between 100,000 and 300,000 psi. Alternatively, a polypropylene co-polymer or a resin material such as PTFE (polytetrafluoroethylene) which is flexible and has a low frictional resistance may be used. An elastomer having a suitable rigidity may also be used.

Figure 5:
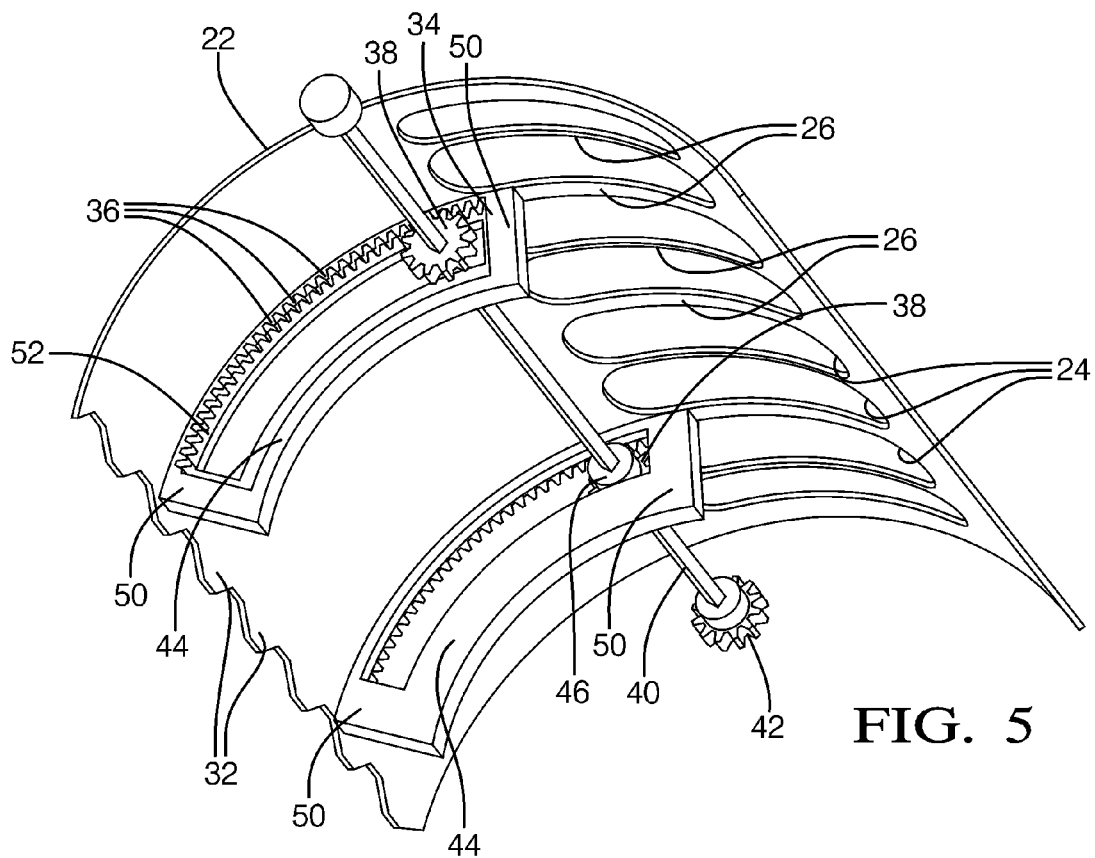
FIG. 5 is a perspective view from the bottom of the valve showing a pair of racks and an undulated trailing edge of the film.

The film 22 includes a leading edge extending between the side edges and a trailing edge extending between the side edges. In order to facilitate movement of the film 22, increase flexibility of the film 22, and reduce noise, at least one of the leading edge and the trailing edge may be undulated 32, as shown in FIG. 5. The undulation 32 may be a continuous curve in the form of a wave or serrated in the form of a plurality of apexes.

A mechanism for moving the film 22 linearly includes at least one rack 34 extending along the film 22 and having teeth 36 disposed therealong. The teeth 36 may be in profile shape or non-linear. A pair of the racks 34 are disposed on the film 22 in spaced and parallel relationship to one another and spaced from the center of the film 22 towards the respective side edges of the film 22 for stabilizing the film 22 as the film 22 is moved. Both racks 34 extend linearly along the curvature of the ribs 30 and film 22, the racks 34 being rigid to support the flexible film 22 in a curved and linear path or arc. In addition, each rack 34 is aligned with one of the strips 26 of film 22 between adjacent openings 24. The strips 26 that are aligned with the racks 34 are preferably wider than the strips 26 that are spaced from the racks 34 for providing additional support to withstand forces exerted on the film 22 through the racks 34. Each rack 34 extends along at least a portion of one of the strips 26 whereby each rack 34 overlaps a strip 26, i.e., is co-extensive with at least a portion of each rack 34 and its associated strip 26. The racks 34 may be attached to the film 22 by adhesive, by heat staking, or by a mechanical fastener or connection. The mechanical fastener may be more specifically defined as a keyhole feature in the film 22 that includes a wide portion (not shown) and a narrow portion (not shown). The racks 34 include a protrusion that is small enough to fit into the wide portion, but not the narrow portion. The mechanical connection is achieved by inserting the protrusion into the wide portion and shifting the protrusion into the narrow portion. Alternatively, the racks 34 may be integrally formed with the film 22.

The pair of racks 34 and the positioning of the racks 34 on the film 22 enable flexibility for engineering of the openings 24, both in terms of geometry of the openings 24 and position of the openings 24 within the film 22. Since different HVAC systems often require such engineering to eliminate excessive noise and achieve desired air flow, the mechanism that employs the racks 34 is useful in a wide range of HVAC systems. The same rack 34 may be used in all of the systems.

A first sprocket 38 and a second sprocket 38 are driven by a shaft 40 extending between the sprockets 38 so as to be rotatably supported by the housing 20 for rotation about the axis of the shaft 40. The sprockets 38 engage the teeth 36 of the racks 34 for moving the racks 34 and the film 22 linearly. The teeth 36 may also be spaced at various distances from the film 22, along the length of the racks 34, to allow further control in positioning of the film 22 within the HVAC system. The shaft 40 may be rotated by a gear train and motor assembly 42, as is well known in art, or by other mechanisms such as, but not limited to, cable-driven assemblies (not shown).

Each rack 34 includes a retainer defined by a strap 44 and a bearing member 46 for retaining the sprocket 38 in engagement with the teeth 36. More specifically, the strap 44 and the bearing member 46 prevent the sprocket 38 from separating from the teeth 36 when the air flow is exerting pressure on the film 22 or when vibration is induced. The strap 44 presents a bearing surface 48 spaced from and extending parallel to the teeth 36. The bearing member 46 is circular and preferably in rolling engagement with the bearing surface 48 as it rotates with the shaft 40 and sprockets 38. The bearing member 46 and the strap 44 are disposed along side of the sprocket 38 and the teeth 36 of the associated rack 34. The bearing surface 48 defines the same path as the teeth 36 so that as the bearing member 46 rolls along the bearing surface 48, the sprocket 38 is maintained in position with the teeth 36. As a result, the sprocket 38 is prevented from compressing against the teeth 36, which results in excessive noise and reduces valve efficiency, e.g., increases an amount of torque required to rotate the shaft 40.

Figure 6:
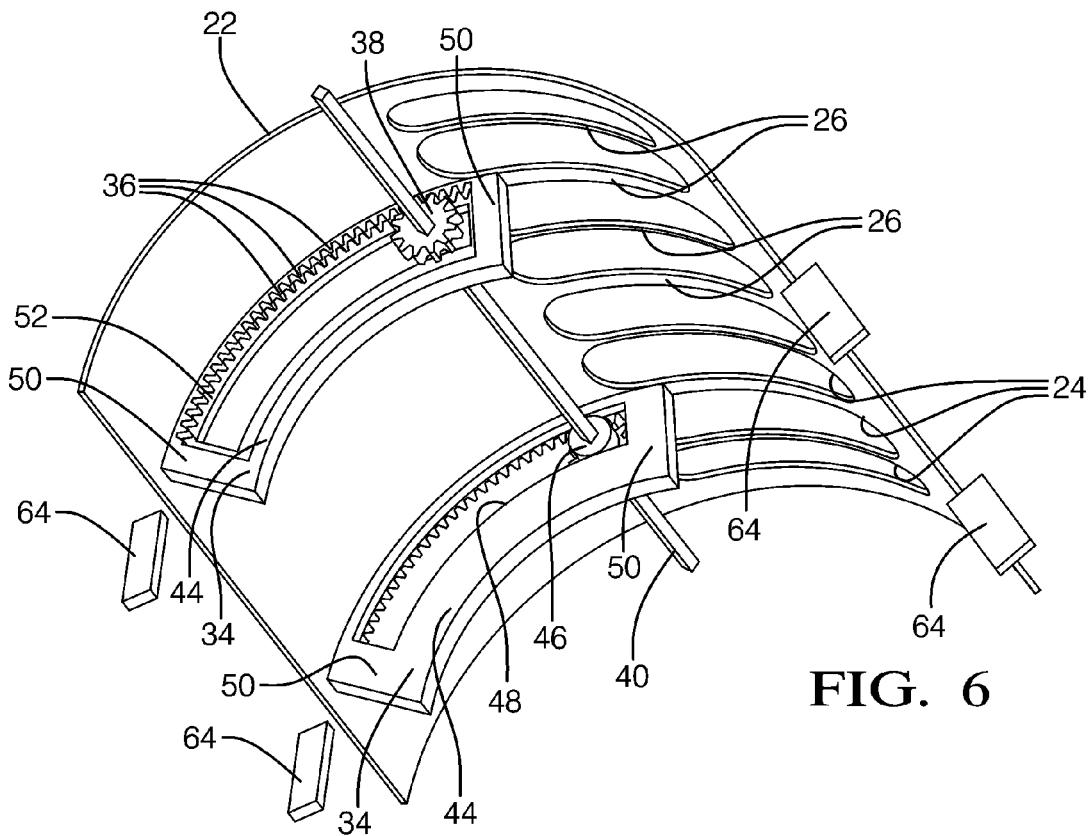
FIG. 6 is a perspective view similar to FIG. 5 but showing stops for limiting movement of the film.

The bearing member 46 and the sprocket 38 comprise a single integral organic polymeric material with the bearing member 46 extending axially from the sprocket 38. Each rack 34 includes a collar section integral with and disposed alongside the teeth 36. The collar section has ends 50 integrally connecting the strap 44 to define the strap 44 and an elongated slot on the outside and an abutment 52 adjacent the teeth 36. The teeth 36 of the rack 34 extend axially from the abutment 52 whereby axial movement of the sprocket 38 is limited by engagement with the abutment 52. The teeth 36 and the strap 44 comprise a single integral organic polymeric material. The movement of the bearing member 46 along the rack 34 is also limited by engaging the ends 50 of the elongated slot. Referring to FIG. 6, the housing 20 may also include stops 64 to limit the movement of the film 22. More specifically, it may be desirable to have at least one of the racks 34 come in contact with the respective stop 64, which may be formed from a dampening material, to limit the movement of the film 22 and to reduce noise at the end of travel of the film 22 by preventing the sprocket 38 from engaging the end 50 of the rack 34.

Due to the presence of the collar section including the abutment 52, at least one of the sprocket 38 or the bearing member 46 may include a concentric ridge (not shown) that is disposed adjacent the abutment 52. The ridge minimizes contact between the sprocket 38 and the abutment 52, and the bearing member 46 and the bearing surface 48, which contact may otherwise result in excessive noise and effort during movement of the film 22.

Obviously, many modifications and variations of the present invention are possible in light of the above teachings. The invention may be practiced otherwise than as specifically described within the scope of the appended claims.

What is claimed is:

1. A heating, ventilation and air conditioning (HVAC) system comprising:
  a housing defining an air passage for directing air flow through said housing,
  an evaporator core and a heater core being supported in said housing for exchanging heat with air passing through said passage,
  a film having side edges and a plurality of elongated openings disposed in parallel relationship between said side edges and separated by strips of said film and supported by said housing to extend across said passage,
  a pair of racks attached to spaced ones of said strips and extending along said adjacent openings and having teeth disposed therealong,
  a pair of sprockets rotatably supported by said housing for rotation about an axis and engaging said teeth of said racks for moving said racks and said film linearly,
  a shaft extending between said sprockets,
  each of said racks including a strap spaced from and extending parallel to said rack teeth to define an elongated slot for overlapping and retaining said sprocket in engagement with said teeth,
  said slot presenting a bearing surface next adjacent to said rack teeth and said strap presenting an opposing and parallel bearing surface,
  a circular bearing member in each of said slots being circular and in rolling engagement with said bearing surfaces of the associated slot,
  each of said bearing members disposed in parallel and abutting engagement with one of said sprockets,
  each of said sprocket extending radially outwardly of the associated one of said circular bearing members, and
  each of said slots presenting a parallel abutment along said slot and disposed axially between said teeth of said adjacent sprocket and said associated bearing member for axially engaging said teeth of said sprocket to limit axial movement of said sprocket.

2. A system as set forth in claim 1 wherein said racks and said film extend linearly along a curvature.

3. A system as set forth in claim 1 wherein each bearing member and associated sprocket comprise a single integral material with said bearing member extending axially from said sprocket.

4. A system as set forth in claim 3 wherein said rack teeth and said strap comprise a single integral material.

5. A system as set forth in claim 1 wherein said film includes a plurality of said openings disposed between said edges with a strip of film extending linearly of said film between said openings.

6. A system as set forth in claim 1 wherein said film has a flexural modulus between 100,000 and 300,000 psi and a thickness between 0.001 and 0.03 inches.

7. A system as set forth in claim 6 wherein said racks and said film extend linearly along a curvature.

8. A system as set forth in claim 7 wherein said curvature is between flat and a radius of 100 mm.

9. A system as set forth in claim 1 wherein said film includes at least one circular aperture in said film adjacent said opening therein for relieving stress.

10. A system as set forth in claim 9 wherein said opening in said film is elongated with rounded corners and including one of said apertures adjacent each of said corners.

11. A system as set forth in claim 9 including a plurality of said openings with each of said openings being elongated with rounded corners.

12. A system as set forth in claim 11 wherein said openings are of different lengths.

13. A system as set forth in claim 1 wherein said film includes a leading edge extending between said side edges and a trailing edge extending between said side edges.

14. A system as set forth in claim 13 wherein at least one of said leading edge and said trailing edge is undulated.

* * * * *